L. P. BASSET.
PROCESS FOR TREATING ORES IN BLAST FURNACES.
APPLICATION FILED OCT. 12, 1917.
1,349,598.
Patented Aug. 17, 1920.
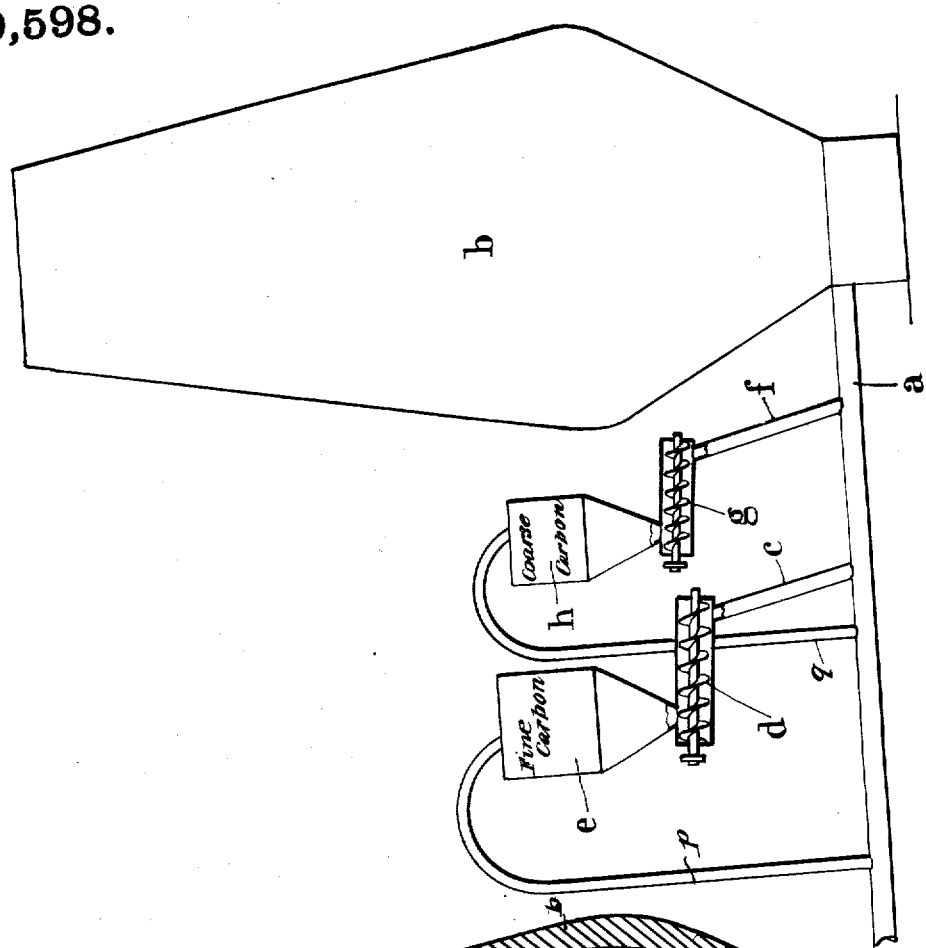
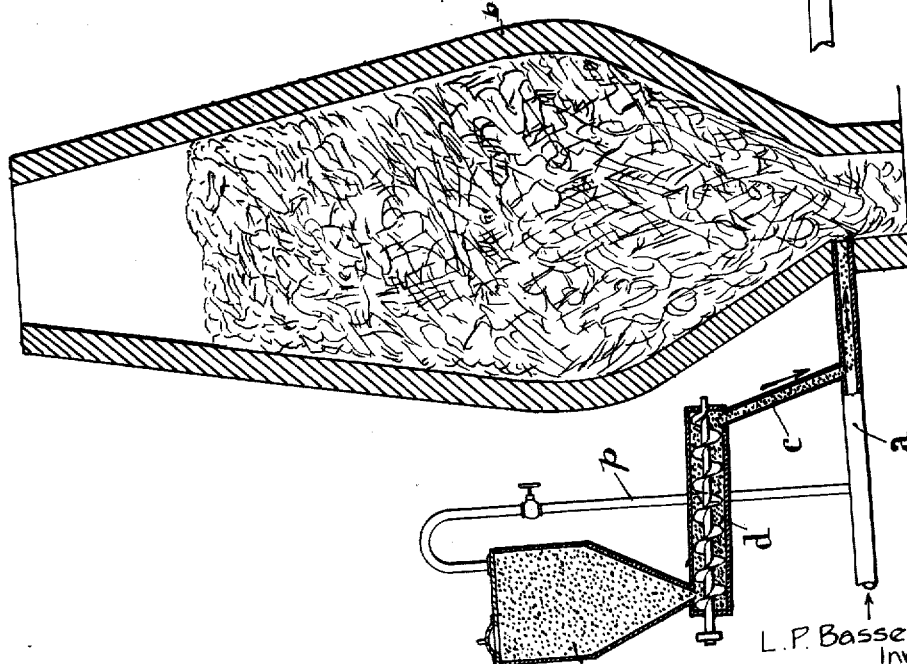
L. P. Basset
Inventor.
By *Albert E. Parker*
Attorney.

UNITED STATES PATENT OFFICE.

LUCIEN PAUL BASSET, OF PARIS, FRANCE.

PROCESS FOR TREATING ORES IN BLAST-FURNACES.

1,349,598.   Specification of Letters Patent.   Patented Aug. 17, 1920.

Application filed October 12, 1917. Serial No. 196,274.

*To all whom it may concern:*

Be it known that I, LUCIEN PAUL BASSET, a citizen of the French Republic, residing at No. 92 Rue de la Victoire, Paris, France, have invented certain new and useful Improvements in Processes for Treating Ores in Blast-Furnaces, of which the following is a specification.

This invention has for its object to provide an improved process and apparatus for treating in blast furnaces, ores, and more particularly iron ores for the manufacture of cast iron, wrought iron and steel.

The improved apparatus is characterized essentially by the feature and the chemical reactions are effected in a blast furnace containing a charge of ore, and fluxes if necessary, under the action of carbon in a state of very fine subdivision injected at the same time as the air for combustion, into the lower part of the blast furnace, the proportions of the said carbon and the said air being made such that the greater portion of the carbon will burn instantaneously so as to produce only carbon monoxid, and only a fraction of the said carbon will escape combustion.

The combustion of the carbon, injected in this manner into the lower part of the blast furnace, has the result:

(1) Of furnishing the heat necessary for maintaining the thermal equilibrium of the blast furnace.

(2) Of supplying the carbon monoxid intended for effecting the reduction of the ore to metallic iron.

The fraction of the carbon that has escaped combustion has the result:

(1) Of reducing the iron oxid that has escaped reduction by the carbon monoxid.

(2) Of effecting by direct reduction the decomposition of the ferruginous slag that is discharged from the blast furnace. This slag is due to the fact that the ore has not been completely reduced during its descent through the blast furnace, and its formation is promoted by the acid character of the flux or gangue present. Further, in the case of the production of cast iron, this carbon fraction is intended to reduce the silica to silicon, the oxids of manganese to manganese, and the phosphates to phosphorus, with the formation of carbon monoxid which acts in addition to the carbon monoxid generated by combustion.

(3) Of carbureting the iron (if the quantity of this carbon is sufficient), for the purpose of producing cast iron or steel.

The proportion of injected carbon is, therefore so determined that the portion that burns shall produce by its combustion only carbon monoxid, and the unburned fraction shall be of such quantity as to assure the effecting of the direct reactions which it is desired to produce, and if necessary the carburation of the metal produced.

The direct reactions as above defined, and produced by the carbon that is not burned, may be effected by reason of the absence of carbonic acid in the zone of combustion. As a matter of fact, the carbonic acid that may result from the reduction of the iron oxid by means of the carbon monoxid in the lower part of the blast furnace, is immediately decomposed by the carbon injected in excess, and produces carbon monoxid which latter maintains the reducing power of the gases at its maximum intensity and increases the height of the zone of activity of these reducing gases.

Since the blast furnace is fed with fuel at its lower part, it is charged only with ores and the necessary fluxes. The result of this is that the carbonic acid due to the reduction of the ore by the carbon monoxid, does not meet any further carbon in the blast furnace, and remains in the form of carbonic acid, whereas in ordinary blast furnaces this carbonic acid by its passage over the carbon at a high temperature contained in the said ordinary blast furnaces, throughout a great portion of their height, is decomposed into carbon monoxid with the absorption of heat and a useless consumption of fuel.

If desired a small quantity of carbon may however be mixed in a desired proportion with the ore for the purpose of assuring the effecting of the direct reactions hereinabove referred to, or any one of said reactions. In such a case the proportion of carbon that is injected into the lower part of the blast furnace would be so regulated as to generate solely the heat and the carbon monoxid that are necessary for reducing the ore.

The injection of the carbon into the lower part of the blast furnace allows of obtaining the maximum thermal effect, because under those conditions, the carbon burns practically in its entirety in the air that is injected with it, which air may be previously heated especially if it is desired to produce refractory cast irons or wrought iron or steel.

By suitably regulating the quantity of carbon and air injected into the lower part of the blast furnace, it will be possible to obtain the desired temperature in the latter. Further, the reducing power and the carburation in the blast furnace may be varied by suitably regulating the quantity of injected carbon, in such a manner that the fraction that does not enter into combustion shall be in a proportion sufficient to effect the desired reduction and carburation.

According to the improved process the iron oxid $Fe_2O_3$ is reduced by the carbon monoxid according to the following equation:

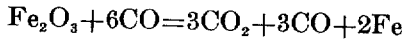

$$Fe_2O_3 + 6CO = 3CO_2 + 3CO + 2Fe$$

If, in this formula, the quantities of heat coming into operation, are placed underneath each of the constituent elements as follows:

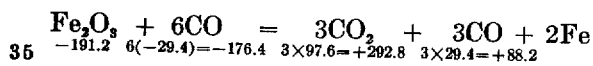

$Fe_2O_3$ + 6CO = $3CO_2$ + 3CO + 2Fe
-191.2  6(-29.4)=-176.4  3×97.6=+292.8  3×29.4=+88.2 it will be found that the algebraic sum is +13.4 heat units, that is to say, that the reaction does not require any outside heat. The indicated excess of carbon monoxid is necessary in order to avoid the inverse reaction.

Since the reaction does not require any outside heat, it will be sufficient that the carbon monoxid and the nitrogen of the air that may be mixed with it, shall be raised to a sufficiently high temperature, so that the sensible heat of this gaseous mixture shall be sufficient to make up for the losses of heat due to radiation and to being carried off by the gases issuing from the mouth of the furnace, as well as by the cast iron and by the slag.

As hereinbefore stated, the improved process allows of producing at will either wrought iron, or cast iron, or steel, by varying the proportions of air and carbon in by the way a rather low ratio, in such a manner as to obtain either a slight excess of air or a slight excess of carbon.

In the first case the whole of the carbon burns, producing carbon monoxid which reduces the iron oxid to pure iron since there is no free carbon present for carbureting it.

In the second case the carbon in excess which has not been burned, carburets the iron and produces cast iron containing a varying percentage of carbon according to the amount of the excess of carbon injected into the blast furnace.

By suitably determining this excess of carbon, intermediate products, namely, various kinds of steel, may be produced.

In each of these cases the ore may have admixed with it as above stated, a certain quantity of carbon intended to produce direct chemical reactions, such as more particularly the decomposition of the ferruginous slag in the manufacture of iron.

In order to reduce the combustibility of the carbon that is intended either for carbureting the iron or for producing certain direct reactions such as the reduction of the ferruginous slag, reduction of the silica, etc., there may be employed a hard carbon, such as anthracite, or any other kind of carbon, crushed somewhat more coarsely than the carbon that is intended to produce carbon monoxid. The said carbon being denser than the carbon for combustion, will fall into the crucible part of the furnace and will become mixed with the slag, and thus effect the desired reduction. This carbon intervening directly as a chemical reagent, may be admitted by an auxiliary distributing device, or else by way of the twyer through which the air and the carbon for combustion are injected into the blast furnace, or by way of a special twyer.

It is further to be noted that, independently of the saving in carbon effected by the improved process, and of the practicability of making at will either iron, or steel, or cast iron, the present invention allows of achieving an output per cubic meter of the blast furnace which is much greater than the ordinary methods, since the whole of the capacity of the furnace is completely utilized by the charge of ore, and moreover this output is very high owing to the instantaneous combustion of the carbon that has been injected in a state of extreme subdivision into the blast furnace.

In the accompanying drawings:

Figure 1 is a vertical section illustrating diagrammatically a blast furnace provided with an improved apparatus for carrying the present invention into effect.

Fig. 2 is a side elevation of a modification of the improved apparatus.

As shown in Fig. 1, $a$ is a twyer, $b$ is the shaft of the blast furnace, $c$ is a duct receiving the discharge of a screw conveyer $d$ which receives its charge from a vessel $e$ containing very finely subdivided carbon ("carbon flour").

Compressed air coming from any suitable blower (not shown) is supplied to the twyer which delivers the said air into the lower part of the blast furnace $b$. As hereinbefore stated the blast furnace $b$ contains only the ore to be treated together with the flux, such as iron oxid $Fe_2O_3$ or a limestone flux, in suitable proportions.

The screw conveyer $d$ is driven at the requisite speed by any suitable gearing (not shown).

When the furnace has been ignited in any suitable manner, the conveyer $d$ is caused to rotate so as to deliver carbon from the vessel $e$ into the duct $c$ which in its turn delivers it into the twyer $a$ wherein it is quickly drawn in by the strong current of air flowing through the same. This carbon dust ignites instantly on arrival in the blast furnace. The proportions of air and carbon thus delivered into the blast furnace are so determined that the carbon will produce by its combustion only carbon monoxid, while a certain quantity of unburned carbon will serve as a chemical reagent as hereinbefore stated.

It is to be understood that the diagrammatic arrangement shown is given solely by way of example for the purpose of facilitating the understanding of the invention. In practice, the blast furnace may be supplied by a plurality of twyers, all or only some of which are arranged to deliver the carbon dust.

In order to prevent the pressure of the air flowing in the twyer $a$, from driving the carbon dust back into the duct $c$, any suitable device (for example a pipe $p$) may be employed for equalizing the pressure in the vessel $e$, the conveyer $d$, the duct $c$, and the twyer $a$, for instance by means of a branch duct establishing communication between the twyer $a$ and the vessel $e$; the latter being closed airtight. A similar means $q$ may be attached to the vessel $h$.

The air delivered by the twyer or twyers $a$ may be preheated.

In the modification shown in Fig. 2, the carbureting carbon is contained in an auxiliary vessel $h$; the latter delivers at its lower end into a screw conveyer $g$ from the other end of which a duct $f$ delivers into the twyer $a$.

According to the degree of carburation which is to be given to the iron for producing a cast iron or steel, the screw conveyer $g$ will be made to rotate at a greater or less speed so as to supply a larger or less quantity of carbureting carbon.

When it is desired to make wrought iron, the conveyer $g$ is stopped, and the conveyer $d$ alone is allowed to work and it delivers only the carbon that is necessary for effecting the reduction of the oxid of iron.

For making wrought iron or steel it will be necessary to preheat the air blown into the blast furnace, because the combustion of the carbon by means of cold air would not produce a temperature sufficient to melt these metals. The preheating of the said air may be effected by the usual means, such as for instance a Cowper stove. Similarly, in making gray cast iron it may also be necessary to preheat the air before it is blown into the furnace.

In practice, the carbon employed will be coal crushed to the fineness of flour, and with or without a certain admixture of coke or anthracite dust. In this case, there is produced in addition to carbon monoxid a certain quantity of hydrogen which possesses, like carbon monoxid, a great capacity for reducing iron oxid; it does not modify however in any way the carrying out of the improved process. Charcoal may also be employed in places where it is abundant.

The improved process and apparatus as hereinbefore described are equally applicable for refining wrought iron, steel, or cast iron, either in a cupola furnace, or in any acid or basic furnace. The possibility of obtaining a very hot reducing flame allows of remelting and refining the metal with a minimum consumption of carbon and without combustion of the metal that is to be refined.

The present invention is likewise applicable to all ores that are reducible by carbon monoxid.

It is to be understood that the constructional details of the improved apparatus for carrying out the improved process may vary according to the various applications.

What I claim is:—

1. A process of treating minerals in a blast furnace, in which the carbon used as combustible is projected in the form of impalpable flour in the lower part of the furnace by superheated air, the carbon being used in such proportion that this carbon-dust by reason of its extreme tenuity is instantly and completely burned, producing therein only carbonic oxid.

2. A process which comprises injecting carbon in the form of a fine powder, and also carbon in a coarser form, into the lower part of an iron reducing blast furnace, together with a blast of air, said blast of air being in amount sufficient to convert at least the major part of the finely powdered carbon into carbon monoxid without burning any considerable amount of the relatively coarser carbon so introduced, whereby such coarser carbon is enabled to act in the furnace as a carburizing agent.

3. A process of treating iron ores for the production at will of either wrought iron, or steel, or cast iron, which comprises injecting the carbon used as fuel in the form of a very finely divided powder, and also injecting carbon used for carburization in the form of a coarser pulverulent mass, both of said forms of carbon being introduced with an air blast of such volume as to burn substantially all of the finely powdered carbon to carbon monoxid, but insufficient to also burn any considerable amount of the coarser carbon, and regulating the amount of such finer carbon in such amount as to produce substantially complete reduction in the furnace, and regulating the amount of such coarser carbon according to whether wrought iron, steel or cast iron is to be produced, whereby the coarser carbon unites with the free iron produced with the production of carbonized iron of the desired carbon content.

In testimony whereof I have signed my name to this specification.

LUCIEN PAUL BASSET. [L. S.]

Witnesses:
 E. C. A. REED,
 FRANCOIS WEBER.